United States Patent
Dienst

(10) Patent No.: US 9,986,673 B2
(45) Date of Patent: Jun. 5, 2018

(54) ZEROING ADJUSTMENT FOR DEPTH CONTROL SYSTEM

(71) Applicant: CNH Industrial America LLC, New Holland, PA (US)

(72) Inventor: Johnathon R. Dienst, DeKalb, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days. days.

(21) Appl. No.: 15/453,332

(22) Filed: Mar. 8, 2017

(65) Prior Publication Data

US 2017/0172049 A1      Jun. 22, 2017

Related U.S. Application Data

(62) Division of application No. 14/295,993, filed on Jun. 4, 2014, now Pat. No. 9,629,298.

(51) Int. Cl.
  *A01B 49/06*   (2006.01)
  *A01B 63/00*   (2006.01)
  *A01C 5/06*   (2006.01)

(52) U.S. Cl.
  CPC ............ *A01B 63/008* (2013.01); *A01B 49/06* (2013.01); *A01C 5/064* (2013.01)

(58) Field of Classification Search
  CPC ......... A01B 49/06; A01B 49/04; A01B 49/00; A01B 63/008; A01B 63/002; A01B 63/00; A01C 5/064; A01C 5/062; A01C 5/06; A01C 5/00
  See application file for complete search history.

(56) References Cited

U.S. PATENT DOCUMENTS

| | | |
|---|---|---|
| 3,362,361 A | 1/1968 | Morrison, Jr. |
| 3,642,073 A | 2/1972 | Geurts |
| 4,178,005 A | 12/1979 | Kent, Jr. |
| 4,355,688 A | 10/1982 | Hamm et al. |
| 4,374,500 A | 2/1983 | Westerfield |
| 4,423,788 A | 1/1984 | Robinson, Jr. et al. |
| 4,624,471 A | 11/1986 | Haines et al. |
| 4,646,620 A | 3/1987 | Buchl |
| 4,819,737 A | 4/1989 | Frase |
| 5,074,227 A | 12/1991 | Schwitters |
| 5,235,922 A | 8/1993 | Deckler |
| 5,452,768 A | 9/1995 | Koberlein |
| 5,538,085 A | 7/1996 | Lowe et al. |
| 5,669,451 A | 9/1997 | Noonan et al. |
| 5,904,107 A | 5/1999 | Kester |
| 6,321,667 B1 | 11/2001 | Shoup |
| 6,328,114 B1 | 12/2001 | Ritchie et al. |
| 6,752,094 B1 | 6/2004 | Truax |
| 7,946,232 B2 | 5/2011 | Patwardhan et al. |
| 8,387,715 B2 | 3/2013 | Rylander |
| 8,616,298 B2 | 12/2013 | Rylander |
| 2011/0030978 A1 | 2/2011 | Baker |
| 2013/0032362 A1 | 2/2013 | Rylander |
| 2014/0190382 A1 | 7/2014 | Anderson et al. |

FOREIGN PATENT DOCUMENTS

WO   WO 2013/101796   7/2013

*Primary Examiner* — Christopher J. Novosad
(74) *Attorney, Agent, or Firm* — Rebecca L. Henkel; Rickard K. DeMille

(57) ABSTRACT

A zeroing adjustment for a depth control system of an agricultural seed planting implement has an adjustable link to compensate for the variable effects of tolerance stack-up and wear, so that all planting units of the implement can be adjusted to a common zero ground penetration setting from which depth settings can be made.

7 Claims, 10 Drawing Sheets

ZEROING ADJUSTMENT FOR DEPTH CONTROL SYSTEM

CROSS REFERENCE TO RELATED APPLICATIONS

This is a non-provisional divisional patent application based upon and having priority from U.S. non-provisional patent application Ser. No. 14/295,993, entitled "ZEROING ADJUSTMENT FOR DEPTH CONTROL SYSTEM," filed Jun. 4, 2014, with is hereby incorporated by reference herein in its entirety.

BACKGROUND OF THE INVENTION

1. Field of the Invention

The present invention generally relates to agricultural seed planting implements and to the depth-setting mechanism on furrow opening assemblies of such implements, and more particularly to an assembly for adjusting the depth-setting mechanism.

2. Description of the Related Art

Farmers utilize a wide variety of seed planting implements, including seed drills and planters. In a known type of planting implement, seed planting or row units are attached to a toolbar extending transverse to the direction of planting. The toolbar is coupled to a tractor or other work vehicle suitable for pulling the planting implement along a field that is to be seeded to a crop. Each planting unit includes a ground penetrating assembly, often including one or more discs, for opening a seed trench or furrow in the ground as the planting implement is pulled across a field. Components of the ground penetrating assembly shape the bottom and sides of the seed trench, and a seed metering device provides individual seeds at a controlled rate for deposit in the seed trench. Furrow closing components of each row unit close the seed trench in a controlled manner.

It is a desirable and perhaps even primary agronomic principle that seeds should be planted at precisely controlled and consistent depths both within a row and from row to row. Since a single planting implement may be used to plant several different types of crops and/or the same crop in different planting locations under different planting and growing conditions, it is necessary that the planting depth is adjustable so that the seeds are placed at a depth that has been determined to be the best for seed germination and plant growth of the particular crop under the existing and anticipated conditions.

To control planting depth, it is known to provide gauge wheels that travel on the surface of the field to control the depth to which the ground penetrating assembly can run, the positions of the gauge wheels being adjustable so that the depth of the seed trench can be controlled within fractions of an inch. Adjustment linkages are provided for changing the relative positioning of the gauge wheels with respect to the ground penetrating assembly. It is known to move the adjustment linkage by a handle connected thereto, the handle engaging a register having multiple positions for securing the handle to maintain the position to which the handle is adjusted.

As growers have gained greater understanding about seed germination and plant growth, and as soil preparation procedures have changed and improved, crop growers have demanded more precise control over seed placement both in the spacing between seeds and in the depth at which the seeds are placed below the soil surface. Accordingly, there is both a demand and a need for even more precise control over the depth of the seed trench that is formed during planting operations. While depth-setting mechanisms have been designed for ever more precise settings, the linkages and other structures forming the depth setting mechanisms have multiple components and connections which can lead to setting errors due to the variable effects of tolerance stack-up, wear and the like. In planting implements having multiple seed planting or row units, it is necessary that all units be similarly calibrated so that all units plant to the same planting depths when set to the same settings. The multiple components and linkages present in depth-setting mechanisms can acquire unacceptably large variations from one row unit to another in the accumulated stack of tolerances in the component parts even when new, and after wear has occurred and/or if parts have been replaced, planting depths can vary significantly between row units that have been adjusted to the same planting depth settings.

What is needed in the art is a structure for zeroing the depth setting mechanisms in a seed planting implement to adjust out the varying effects of tolerance stack-up and wear between different seed planting units of the implement.

SUMMARY OF THE INVENTION

The present invention provides a seed planting implement with consistent depth setting control for ground penetrating components of the implement by providing an adjustable link in the adjustment mechanism to compensate for the variable effects of tolerance stack-up and wear.

In one form thereof, the invention is directed to an agricultural seed planting implement with a ground penetrating assembly, a depth setting linkage assembly including a control assembly and a depth control linkage arm associated with the ground penetrating assembly and having adjustable positions for changing a depth to which the ground penetrating assembly can operate. The depth control linkage arm is selectively variable in length.

In another form, the invention is an agricultural seed planting implement with a toolbar and a plurality of individual seed planting units connected to the toolbar. Each seed planting unit of the plurality of seed planting units includes a ground penetrating assembly and a depth control assembly for changing a depth to which the ground penetrating assembly can operate. Each depth control assembly is adjustable to a common setting from which depth settings are made for the ground penetrating assemblies.

In a further form thereof, the invention is an agricultural seed planting implement with a ground penetrating assembly, an adjustable gauge wheel supporting said ground penetrating assembly at controlled penetration depths; and a depth control linkage arm adjustably positioning said gauge wheel, said depth control linkage arm having a selectively variable length.

An advantage of the zeroing adjustment for depth control systems disclosed herein is that the penetration depth for seed planting equipment can be more accurately and consistently set across multiple planting units of an agricultural seed planting implement.

Another advantage of the zeroing adjustment for depth control systems disclosed herein is that it compensates for the variable effects of tolerance stack-up and wear.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
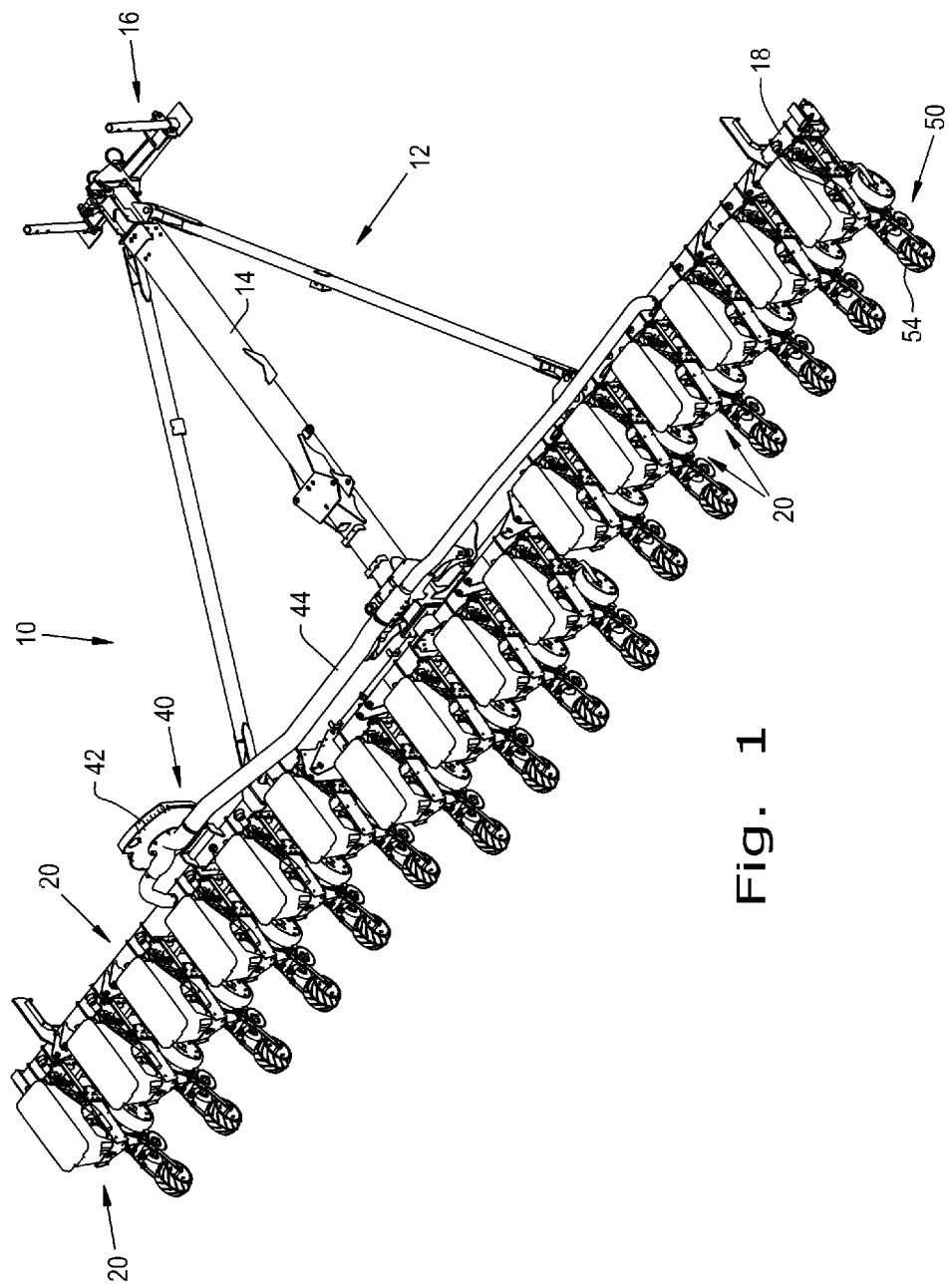
FIG. 1 is a perspective view of an agricultural seed planting implement.
Figure 2:
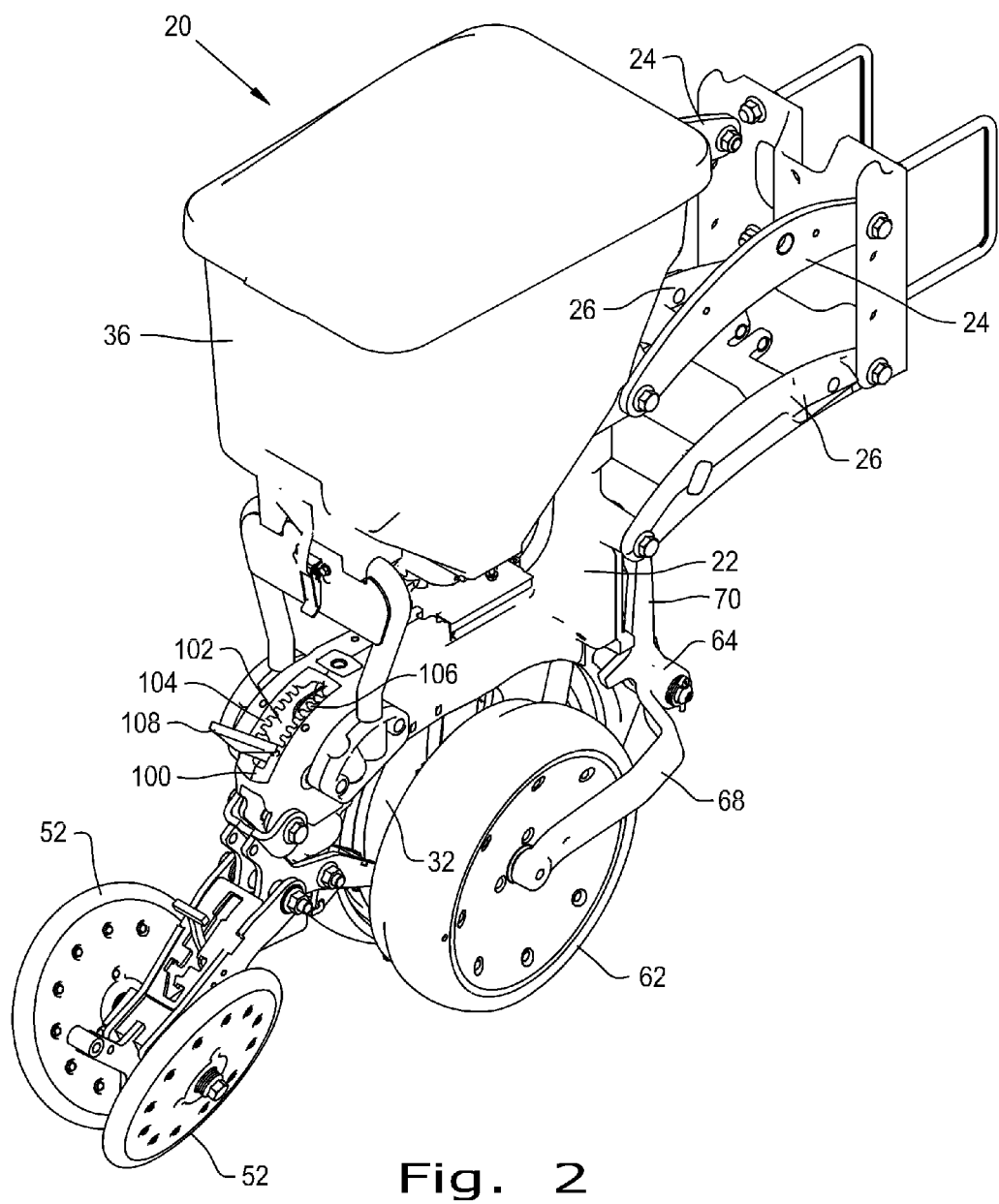
FIG. 2 is a perspective view of one of the seed planting units of the seed planting implement.
Figure 3:
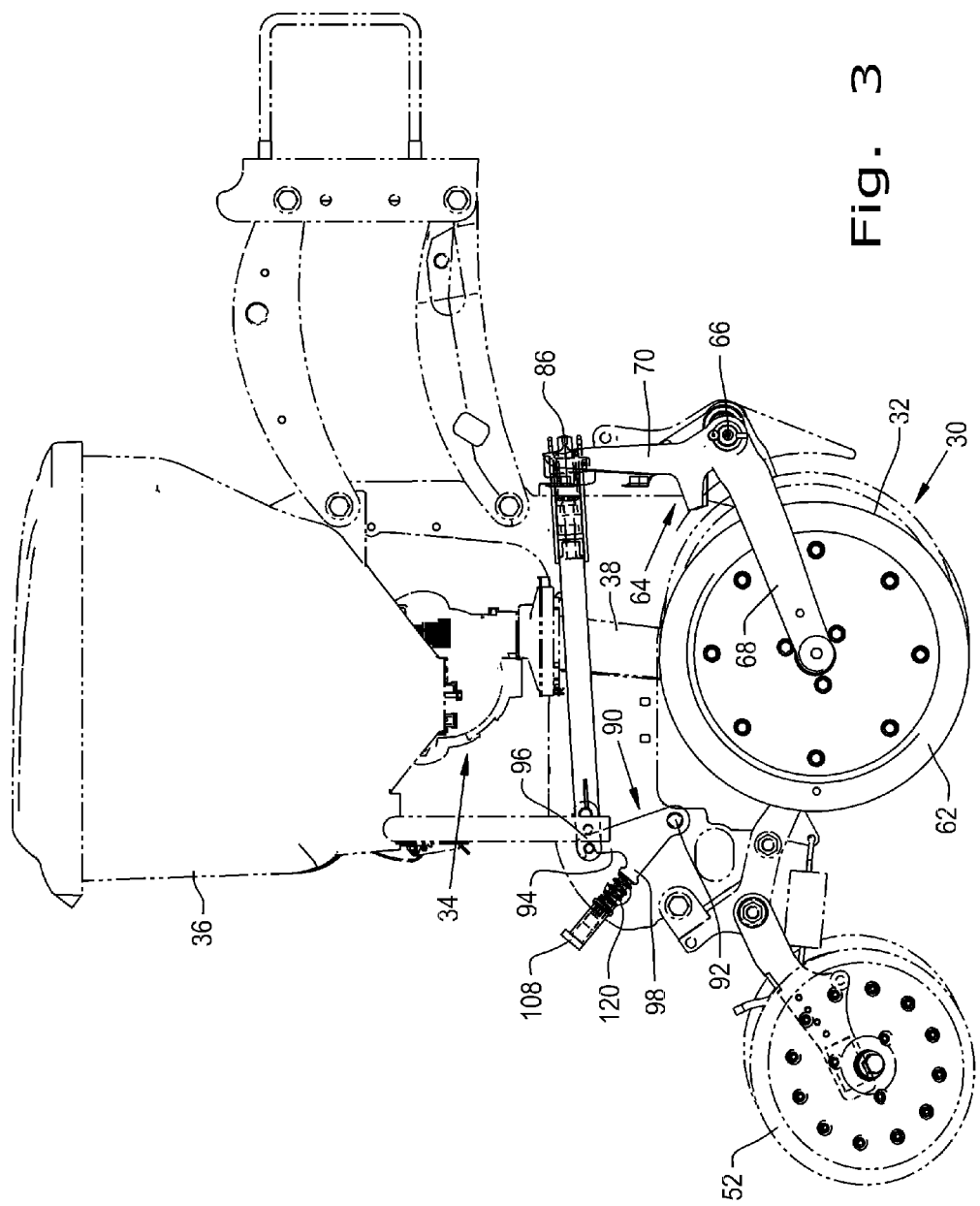
FIG. 3 is a side view of the seed planting unit.

Referring now to the drawings more specifically and to FIG. 1 in particular, a seed planting implement 10 is shown. Seed planting implement 10 has a frame that includes a tow bar assembly 12 having a tow bar 14 and a connection assembly 16 at the longitudinally forward end thereof configured for mating with a corresponding hitch of a tractor or other work vehicle (not shown) for pulling seed planting implement 10 through a field. A laterally extending toolbar 18 is generally transverse to tow bar 14 and thereby generally transverse to the direction implement 10 is towed during planting operations. A plurality of seed planting units (or row units) 20 are connected to toolbar 18 in a side by side relationship, each of the seed planting units (row units) being substantially identical to the others. In the exemplary embodiment shown, seed planting implement 10 includes sixteen seed planting units 20, only some of which are identified with reference numbers; however, it should be understood that more or fewer seed planting units can be provided on a particular seed planting implement.

Referring now primarily to FIG. 2 through FIG. 5, each seed planting unit 20 includes a frame 22 that is connected to toolbar 18 by upper arms 24 and lower arms 26, each arm 24, 26 being connected to frame 22 and to toolbar 18. Accordingly, each seed planting unit 20 extends rearward from toolbar 18 to plant a row of seeds as seed planting implement 10 is towed across a field. The individual planting units 20 are spaced along toolbar 18 to provide planted seed rows of a desired spacing. During a planting operation, forward movement of seed planting implement 10 causes each seed planting unit 20 to form a seed trench, deposit equally spaced seeds in the seed trench and close the seed trench over the seeds deposited in the seed trench.

Each seed planting unit 20 includes a ground penetrating or seed trench opening assembly 30 (FIG. 3) having a pair of forwardly and downwardly angled opening discs 32 that converge forwardly and downwardly to open a furrow or seed trench as seed planting implement 10 moves forward. A seed metering system 34 receives seeds from a seed hopper 36 and provides individual seeds at a controlled rate to a seed tube 38 for deposit in the bottom of the seed trench formed. A vacuum system 40 (FIG. 1), which includes a fan 42 and air lines 44, provides vacuum to seed metering system 34 for the operation of the seed metering system in supplying seeds to seed tube 38.

A seed trench closing mechanism 50 (FIG. 1) at the trailing end of each seed planting unit 20 closes the seed trench after the seeds have been deposited in the seed trench. Seed trench closing mechanism 50 includes a pair of closing wheels 52 (FIG. 2) that operate on opposite sides of the seed trench to move soil back into the seed trench and over the seeds deposited in the bottom of the seed trench. A trailing press wheel 54 (FIG. 1) travels along the top of the seed trench and firms the soil replaced in the seed trench to eliminate air pockets.

The depth to which opening discs 32 are allowed to penetrate the ground is controlled by a depth control assembly 60 (FIG. 5) that includes a pair of gauge wheels 62, gauge wheel arms 64 and a depth setting and linkage assembly 80. One of the gauge wheels 62 is provided adjacent each opening disc 32. Each gauge wheel 62 is rotatably mounted on one of the gauge wheel arms 64 that are pivotally connected at a pivotal attachment 66 to seed planting unit frame 22. Each gauge wheel arm 64 has a wheel retention segment 68 extending generally rearward from pivotal attachment 66 and a control segment 70 extending generally upward from pivotal attachment 66. Pivotal movement of gauge wheel arm 64 about pivotal attachment 66 to frame 22 changes the relative height position of gauge wheel 62.

A pivoted position to which each gauge wheel arm 64 is placed is controlled by depth setting and linkage assembly 80 having a depth setting control assembly 82, a depth control linkage arm 84 and a wobble bracket 86 connected to linkage arm 84 by a pivotal connection 88. Control assembly 82 adjusts an axial position for linkage arm 84 and thereby the position of wobble bracket 86, with wobble bracket 86 engaging control segments 70 of gauge wheel arms 64. Raising gauge wheels 62 allows opening discs 32 to penetrate deeper into the ground, and lowering gauge wheels 62 limits the depth to which discs 32 can penetrate into the ground.

Figure 4:
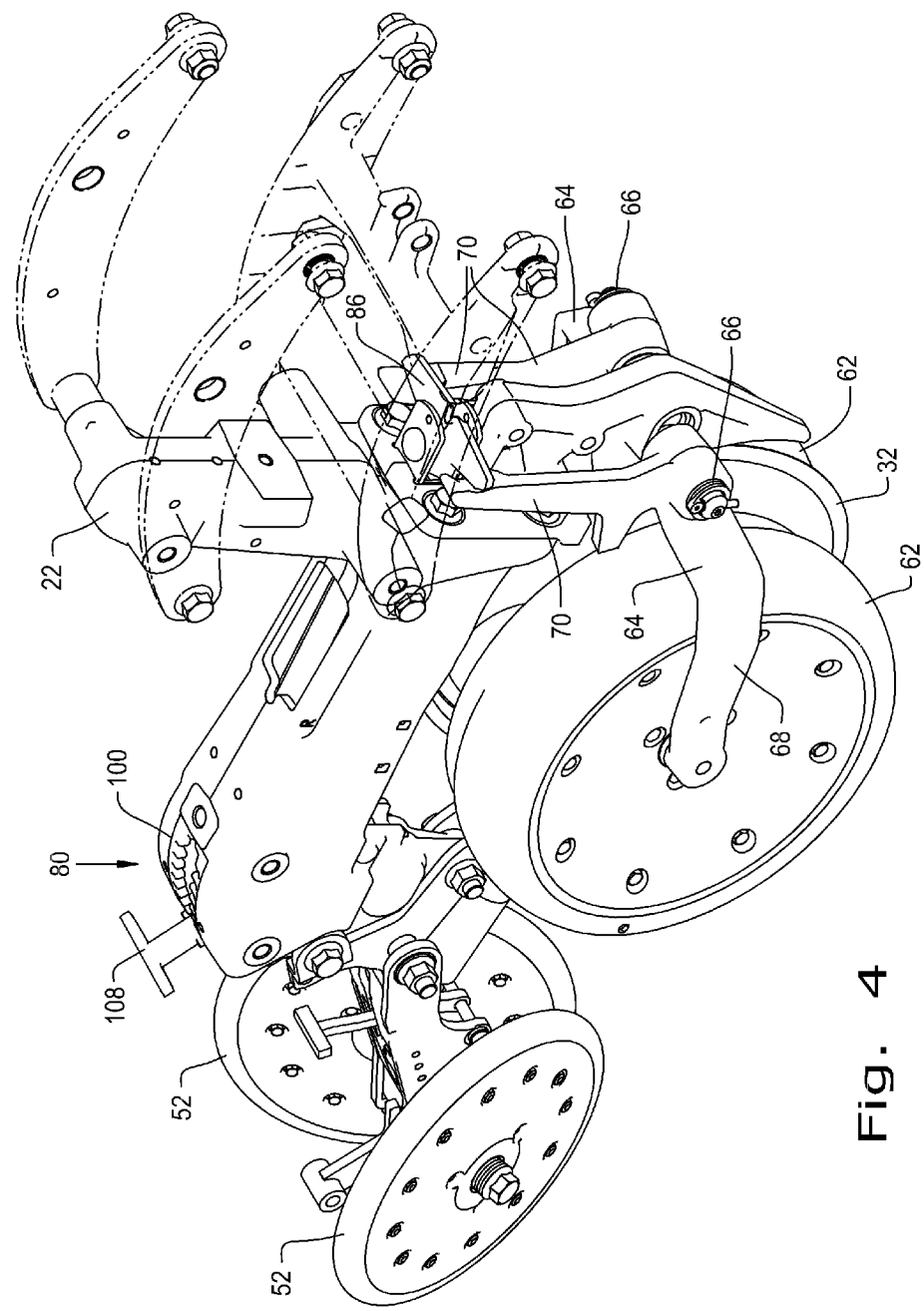
FIG. 4 is another perspective view of the seed planting unit, showing the unit from an angle different from the angle shown in the perspective view of FIG. 2.
Figure 5:
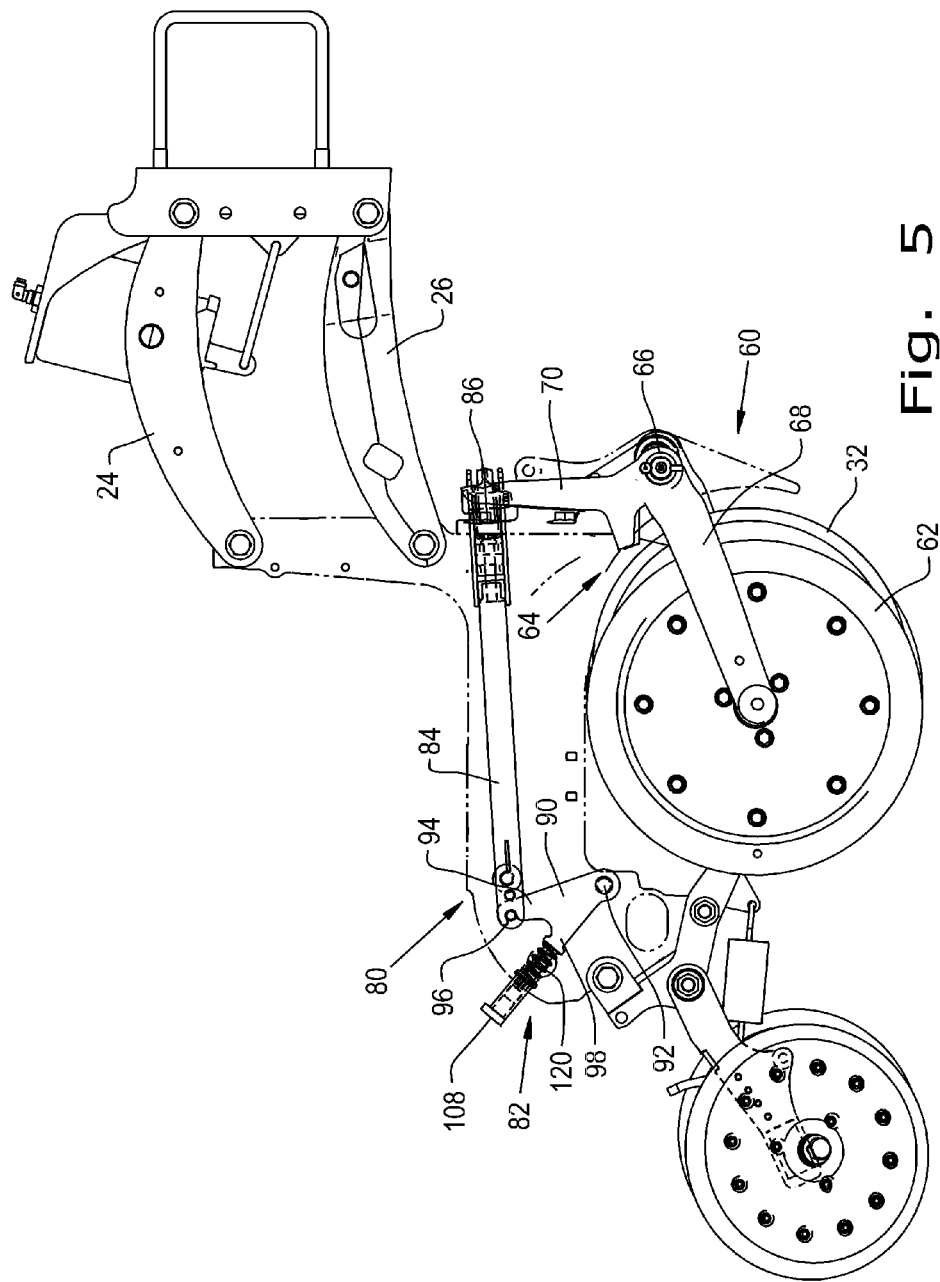
FIG. 5 is a fragmentary side view of the seed planting unit illustrating inner components used for depth setting.
Figure 6:
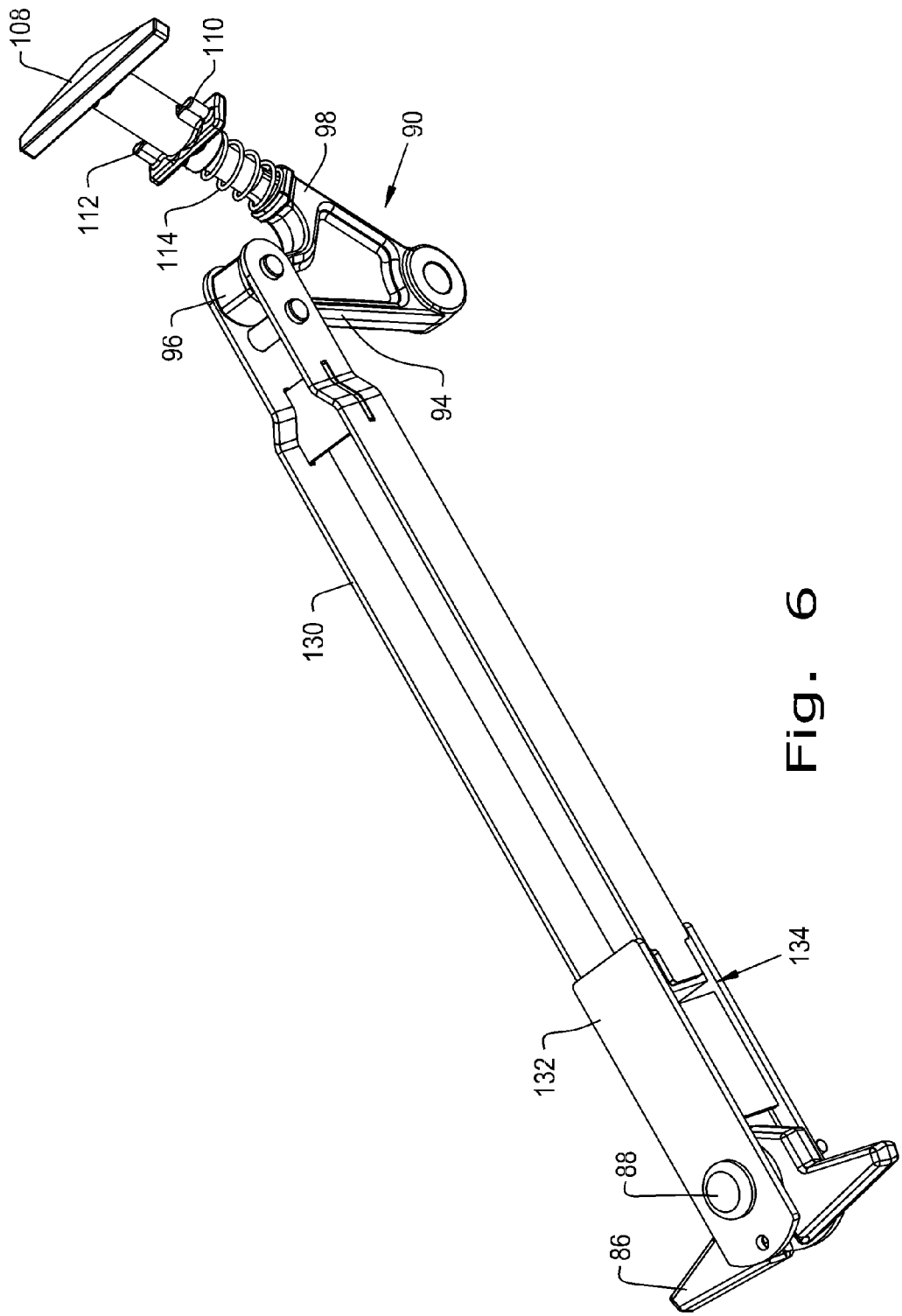
FIG. 6 is a perspective view a depth setting linkage assembly in the seed planting unit.

Referring now primarily to FIG. 4 through FIG. 6, control assembly 82 includes a pivot arm 90 of general V-shape, with a pivotal connection 92 at the base thereof to seed planting unit frame 22. An inner arm 94 of pivot arm 90 has a pivotal connection 96 to depth control linkage arm 84. An outer arm 98 of pivot arm 90 extends through a depth setting register 100. Depth setting register 100 defines a slot 102 with a first row of notches 104 along one side of slot 102 and a second row of notches 106 along an opposite side of slot 102. Opposed pairs of notches including one of the notches 104 and one of the notches 106 define securing locations for securing the position of pivot arm 90 after adjustment thereof.

A handle 108 is provided on the distal end of outer arm 98 and includes laterally projecting position holding pegs 110, 112 for engaging notches 104, 106 of register 100. The pairs of notches including one of the notches 104 and one of the notches 106 secure the position of pivot arm 90 by receiving and engaging pegs 110, 112. Handle 108 is mounted on a spring 114, and can be depressed relative to outer arm 98 such that pegs 110, 112 disengage notches 104, 106 by sliding inwardly through the notches so that handle 108 can be moved fore and aft in slot 102 to align pegs 110, 112 with different pairs of notches 104, 106. As handle 108 rebounds outwardly, pegs 110, 112 slide into the pair of notches 104, 106 with which the pegs are aligned. Movement of handle 108 fore and aft pivots pivot arm 90 about its pivotal connection 92, and thereby extends or withdraws depth control linkage arm 84, to alter the position of wobble bracket 86, which in turn controls the positions of control segments 70 and thereby the allowable height of gauge wheels 62.

Depth control linkage arm 84 includes a rearward portion 130 that is connected to pivot arm 90 by pivotal connection 96, and a forward portion 132 that is connected to wobble bracket 86 by pivotal connection 88. An intra-link connection 134 between rearward portion 130 and forward portion 132 is axially adjustably so that the overall length of linkage arm 84 is selectively variable. Rearward portion 130 and forward portion 132 are telescopically engaged with one another to accommodate the overall axial adjustability of connection 134 to change the overall length of linkage arm 84.

Figure 7:
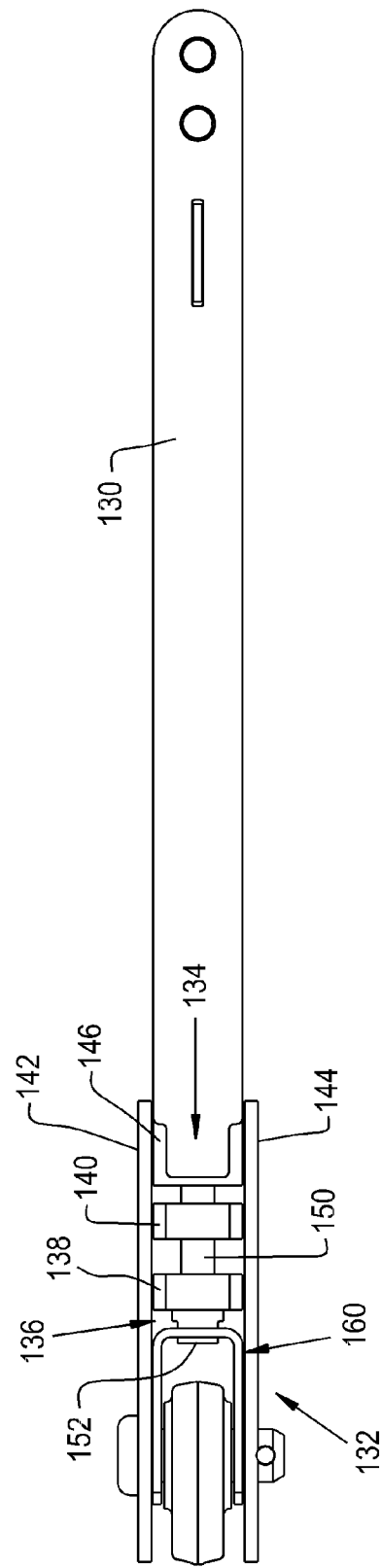
FIG. 7 is a side view of the depth linkage assembly.

Referring now more particularly to FIG. 7, connection 134 includes a bolt 136 extending through one or more fixed block 138, 140 fixed between side plates 142, 144 of forward portion 132 and received by threaded engagement in a threaded block 146 affixed to rearward portion 130. Bolt 136 includes a shank 150 that is threaded along at least a portion of an end thereof, and a head 152 having a drive configuration 154 (FIGS. 9 & 10) formed therein for engagement by an appropriate tool for rotating bolt 136. In the exemplary embodiment shown, drive configuration 154 is a hexagonal depression for receiving a hex key (Allen wrench) in rotational drive engagement. It should be understood that drive configuration 154 can be of other shaped depressions in head 152 to engage other internally received drive tools, or drive configuration 154 can be an external shape of head 152 to receive a wrench, drive socket or the like. Head 152 includes opposed external flats 156, 158 (FIG. 10) that also can receive a wrench, drive socket or the like. Advancing the threaded engagement of bolt 136 into threaded block 146 decreases the overall length of depth control linkage arm 84, and retracting the threaded engagement of bolt 136 from threaded block 146 increases the overall length of depth control linkage arm 84.

Figure 10:
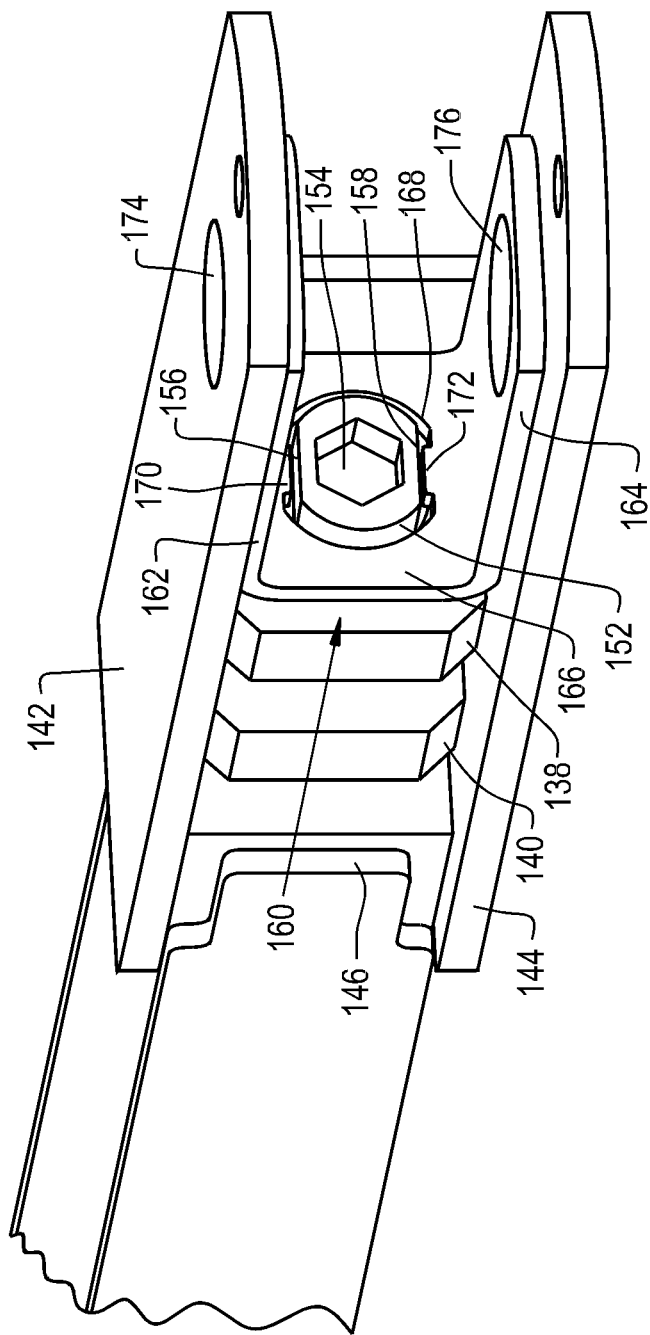
FIG. 10 is another perspective view of the linkage assembly as installed and adjusted.

Referring now particularly to FIG. 10, a lock mechanism in the form of a bracket or cage 160 is provided to secure the position to which bolt 138 has been adjusted. Cage 160 has sides 162, 164 and an end 166. End 166 has a shaped hole 168 therein including opposed flats 170, 172 to receive and engage head 152, with flats 156, 158 of head 152 received against flats 170, 172 of shaped hole 168 to prevent further rotation of bolt 138. Sides 162, 164 of cage 160 are received against side plates 142, 144, and together side plates 142, 144 and sides 162, 164 form aligned holes 174, 176 for receiving a pin forming pivotal connection 88. It should be understood that other structures can be used for preventing the unintended rotation of bolt 136 after the adjustment thereof.

Figure 8:
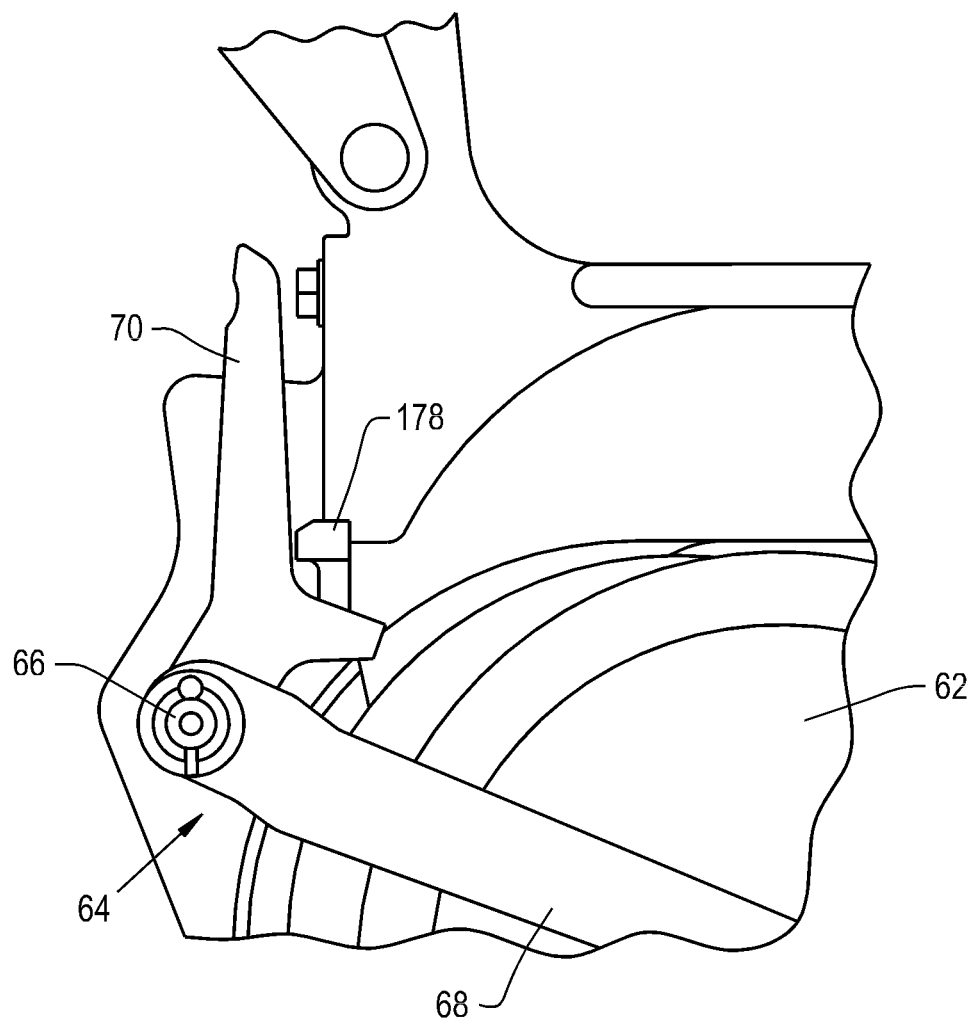
FIG. 8 is a fragmentary elevation view of the seed planting unit.

Zero adjustment or calibration of depth control assembly 60 is performed upon initial assembly and can be performed again from time to time as a maintenance procedure. For example, it may be desirable to zero adjust the system after significant wear and/or when replacement parts have been installed. Zero adjustment is performed with wobble bracket 86, pivotal connection 88 and cage 160 not yet installed (during initial assembly) or removed (when performed as a maintenance step). Seed planting implement 10 is adjusted so that toolbar 18 is elevated, lifting all seed planting units 20 off the ground. As illustrated in FIG. 8, each gauge wheel 62 drops, pivoting its respective gauge wheel arm 64 about the pivotal attachment 66 thereof until adjustable control segment 70 contacts a frame stop 178. This allows removal of wobble bracket 86, pivotal connection 88 and cage 160 when performed as a maintenance operation or the insertion of depth control linkage arm 84 during assembly.

Figure 9:
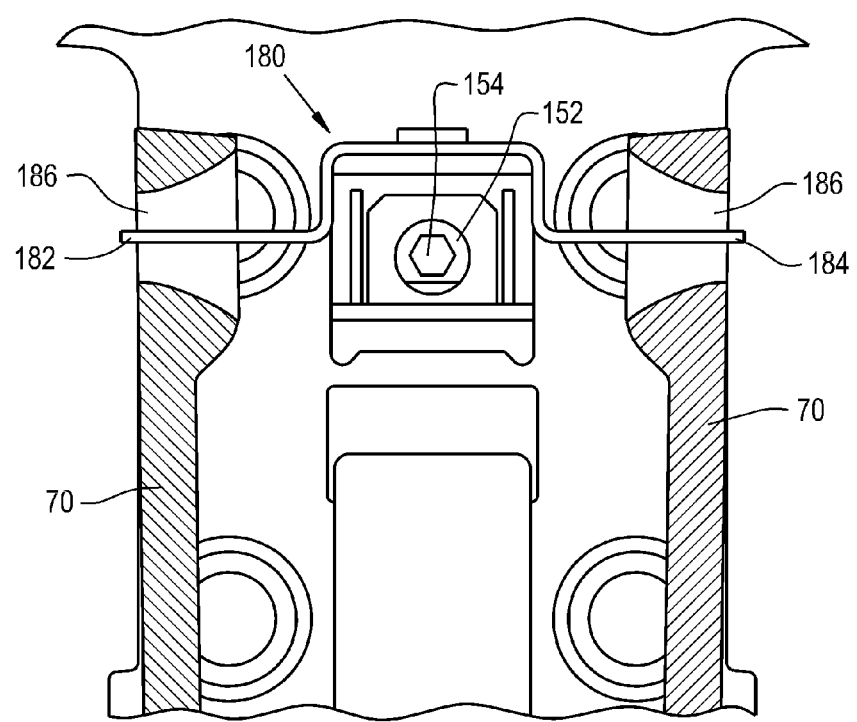
FIG. 9 is a cross-sectional view of the seed planting unit.

With seed planting implement 10 thus prepared, toolbar 18 is lowered until opening discs 32 barely contact a flat level surface upon which implement 10 is positioned. Opening discs 32 thereby rest at a zero penetration setting, and depth control assembly 60 can be adjusted for proper registration of handle 108 at the zero penetration setting. Control assembly 82 is adjusted such that handle 108 is engaged with the appropriate notches 104, 106 for a zero penetration setting. Bolt 136 is then adjusted relative to threaded block 146 to advance further into or to withdraw further from threaded block 146, while at all times remaining threadedly engaged there with. In this way, the overall length of depth control linkage arm 84 is adjusted so that when wobble bracket 86 is re-attached thereto it will properly engage control segments 70 of gauge wheel arms 64 and without unacceptable looseness. It should be understood that the appropriate length for control linkage arm 84 can be determined in numerous ways, including measurement between the end thereof and a fixed point such as, for example, depth setting register 100 or another fixed point of reference. A convenient way for determining the proper overall length of linkage arm 84 is by the use of a gauge 180. As illustrated in FIG. 9, gauge 180 includes wings 182, 184 to be received in wobble bracket slots 186 of control segments 70. Bolt 136 is rotated so as to advance further into, or withdraw further from threaded block 146 and thereby change the overall length of depth control linkage arm 84 until the outer end of control linkage arm 84 is received at a designated position relative to gauge 180 and wings 182, 184 are properly received in wobble bracket slots 186. Bolt head 152 is adjusted as necessary so that flats 156, 158 thereof are properly positioned such that cage 160 can be installed with shaped hole 168 thereof engaging bolt head 152, with flats 156, 158 of bolt head 152 disposed against flats 170, 172 in shaped hole 168 of cage 160. Gauge 180 is removed, and cage 160 is installed. Wobble bracket 86 and pivotal connection 88 are installed, thereby securing cage 160 in position and locking bolt 136 against unintended rotation.

When all row units 20 of seed planting implement 10 are adjusted in this manner to a common zero penetration setting, each will have a common elevation relative to the zero setting to which it was adjusted. Each can then be set so that the opening discs 32 thereof will penetrate a same depth into the ground if the control assemblies 82 thereof are adjusted to similar settings in registers 100. In that way, all row units that are set to the same settings will deposit seeds at the same depths below the surface of the ground.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural seed planting implement, comprising:
   a ground penetrating assembly;
   an adjustable gauge wheel supporting said ground penetrating assembly at controlled penetration depths;
   a depth control linkage arm adjustably positioning said gauge wheel, said depth control linkage arm including first and second portions telescopically engaged with each other to provide a selectively variable length;
   a threaded fastener adjustably coupling said first and second portions of said depth control linkage arm, said threaded fastener being configured to adjust a relative axial position between said first and second portions; and
   a locking mechanism removably coupled to said depth control linkage arm, said locking mechanism being configured to the prevent rotation of said threaded fastener relative to said depth control linkage arm.

2. The agricultural seed planting implement of claim 1, wherein said threaded fastener comprises a head and said locking mechanism defines a hole extending therethrough, said hole being configured to receive said head so as to prevent rotation of said threaded fastener relative to said depth control linkage arm.

3. The agricultural seed planting implement of claim 2, wherein said head of said threaded fastener defines at least one flat portion and said locking mechanism defines a flat portion of said hole, said flat portion of said head being configured to engage said flat portion of said hole so as to prevent rotation of said threaded fastener relative to said depth control linkage arm.

4. The agricultural seed planting implement of claim 1, wherein said first portion of said depth control linkage arm comprises first and second side plates spaced apart from each other, said locking mechanism being removably coupled between said first and second side plates.

5. The agricultural seed planting implement of claim 4, wherein said locking mechanism comprises a first side, a second side spaced apart from said first side, and an end extending from said first side to said second side, said first side of said locking mechanism being coupled to or in contact with said first side plate of said first portion of said depth control linkage arm, said second side of said locking mechanism being coupled to or in contact with said second side plate of said first portion of said depth control linkage arm.

6. The agricultural seed planting implement of claim 1, wherein said first portion of said depth control linkage arm comprises first and second side plates spaced apart from each other, said agricultural seed planting implement further comprising:
   at least one fixed block coupled between said first and second side plates such that said threaded fastener extends through said at least one fixed block.

7. The agricultural seed planting implement of claim 1, further comprising:
   a threaded block coupled to said second portion of said depth control linkage arm, said fastener being configured to threadingly engage said threaded block.

* * * * *